US010751657B2

(12) United States Patent
Karlsson et al.

(10) Patent No.: US 10,751,657 B2
(45) Date of Patent: Aug. 25, 2020

(54) FILTER ELEMENT WITH FLAT SHAPE ADAPTED TO BE LOCKED IN CURVED SHAPE

(71) Applicant: VOLVO TRUCK CORPORATION, Gothenburg (SE)

(72) Inventors: Sebastian Karlsson, Gothenburg (SE); Jesper Blomstrand, Härryda (SE); Fredrik Bramer, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 178 days.

(21) Appl. No.: 15/777,772

(22) PCT Filed: Dec. 17, 2015

(86) PCT No.: PCT/EP2015/080287
§ 371 (c)(1),
(2) Date: May 21, 2018

(87) PCT Pub. No.: WO2017/102008
PCT Pub. Date: Jun. 22, 2017

(65) Prior Publication Data
US 2018/0333666 A1    Nov. 22, 2018

(51) Int. Cl.
*B01D 46/00* (2006.01)
*B01D 46/10* (2006.01)
(Continued)

(52) U.S. Cl.
CPC ....... *B01D 46/0005* (2013.01); *B01D 46/103* (2013.01); *B01D 46/24* (2013.01);
(Continued)

(58) Field of Classification Search
CPC .......... B01D 2275/203; B01D 46/0005; B01D 46/103; B01D 46/24; B01D 46/2403;
(Continued)

(56) References Cited

U.S. PATENT DOCUMENTS 2,663,660 A    12/1953  Layte
5,409,606 A    4/1995  Spencer
(Continued)

FOREIGN PATENT DOCUMENTS

CN    2930031 Y    8/2007
CN    201366411 Y    12/2009
(Continued)

OTHER PUBLICATIONS

International Search Report (dated Oct. 14, 2016) for corresponding International App. PCT/EP2015/080287.
(Continued)

*Primary Examiner* — Robert Clemente
(74) *Attorney, Agent, or Firm* — Withrow & Terranova, PLLC (57) ABSTRACT

A filter element is provided for being removably arranged in a filter housing, the filter element including a filter material body. The filter element is adapted to assume a first state, in which it has a substantially flat shape, and a second state, in which it has such a curved shape, such that opposite outer peripheral sides of the filter element are directed towards each other and in which it is adapted for a filtering operation. The filter element is adapted to be locked in the second state when arranged in the filter housing. A filter system is also provided including a filter element and an anchoring device adapted to be arranged between the opposite outer peripheral sides of the filter element when it is curved to the second state.

15 Claims, 8 Drawing Sheets

(51) Int. Cl.
*B01D 46/24* (2006.01)
*B01D 46/52* (2006.01)
*F02M 35/024* (2006.01)

(52) U.S. Cl.
CPC ....... *B01D 46/2403* (2013.01); *B01D 46/521* (2013.01); *F02M 35/0245* (2013.01); *F02M 35/02483* (2013.01); *B01D 2265/02* (2013.01); *B01D 2265/023* (2013.01); *B01D 2275/203* (2013.01); *B01D 2279/60* (2013.01)

(58) Field of Classification Search
CPC .......... B01D 2265/02; B01D 2265/023; B01D 2279/60; B01D 46/521; F02M 35/0245; F02M 35/02483
See application file for complete search history.

(56) References Cited

U.S. PATENT DOCUMENTS

| | | | | |
|---|---|---|---|---|
| 6,368,506 | B1* | 4/2002 | Gebert | B01D 29/21 210/455 |
| 2004/0112020 | A1 | 6/2004 | Wilson | |
| 2009/0019824 | A1* | 1/2009 | Lawrence | B01D 46/0004 55/497 |
| 2011/0233133 | A1 | 9/2011 | Wacker et al. | |
| 2012/0097593 | A1 | 4/2012 | Maier et al. | |
| 2014/0090344 | A1 | 4/2014 | Wagner et al. | |
| 2014/0215980 | A1 | 8/2014 | Berisha et al. | |

FOREIGN PATENT DOCUMENTS

| | | |
|---|---|---|
| CN | 201755438 U | 3/2011 |
| CN | 102711953 A | 10/2012 |
| CN | 103375906 A | 10/2013 |
| DE | 102008058237 A1 | 6/2009 |
| EP | 1654499 B1 | 11/2009 |
| EP | 2509699 B1 | 3/2016 |
| GB | 2095572 A | 10/1982 |
| WO | 9425138 A1 | 11/1994 |

OTHER PUBLICATIONS

First Office Action for Chinese Patent Application No. 2015800853473, dated May 15, 2020, 13 pages.

* cited by examiner

FILTER ELEMENT WITH FLAT SHAPE ADAPTED TO BE LOCKED IN CURVED SHAPE

BACKGROUND AND SUMMARY

The present disclosure relates to a filter element for being removably arranged in a filter housing and comprising a filter material body. The present disclosure also relates to a filter system comprising such a filter element. An internal combustion engine system and a vehicle comprising such a filter system is also disclosed. The disclosure further comprises a method for exchange of a filter element in a filter system comprising the steps of removing a used filter insert from a filter housing and inserting a new filter element into the filter housing. More specifically, the filter element is adapted for cleaning a fluid for the internal combustion engine, wherein the fluid may be a gas such as air or a liquid such as a lubricating oil or fuel. Such filter arrangements may be provided onboard vehicles and in other applications containing transport systems to remove unwanted solids or other contaminants from the fluid. The filter element may alternatively be called filter cartridge, filter module or filter insert.

Filters are used in many places in a vehicle. It is i.a. well known to provide an internal combustion engine with a filter for cleaning a fluid, such as an air filter for cleaning intake air. Other filter types include for example oil filters for filtering an engine oil and fuel filters for cleaning a fuel to be provided to the engine. Such filters in a vehicle are replaced on a regular basis to keep the performance of the filter itself and of the devices receiving the filtered fluid at a desired level. The same is true for the filter types mentioned here, but naturally also for filters used in other applications than vehicles. The filter may be designed in many different shapes and configurations.

In the truck automotive industry, a common solution for air filters is to use a cylindrical housing with a cylindrical air filter. The filter is generally replaced through axial displacement in the housing. The filter often comprises an inner cavity also of cylindrical shape into which the filtered air is penetrating through the filter material. A disadvantage with such filters is that they are voluminous during transportation and storage when not in use in the vehicle. They however provide a relatively seen large filtering surface area, through which the flowing air may be filtered.

These types of cylindrical filters are very common and therefore e.g. replacement filters for maintenance purposes need to conform to the common design.

It is desirable to at least to some extent alleviate the shortcomings discussed above in relation to known filters, and to preferably improve a filter, especially for transport efficiency and handling ease, or at least to provide a useful alternative.

According to a first aspect of the present disclosure, a filter element is disclosed for being removably arranged in a filter housing, the filter element comprising a filter material body and the filter element is adapted to assume a first state, in which it has a substantially flat shape, and a second state, in which it has such a curved shape, that opposite outer peripheral sides of the filter element are directed towards each other and in which it is adapted for a filtering operation. The filter element is further adapted to be locked in the second state when arranged in the filter housing.

A filter element of this kind proves advantageous in that it may replace already existing filter elements, which for example may have a cylindrical design. The filter element according to this disclosure hence combines the design of existing filter elements with the positive effects of the present disclosure. By having a filter element of this kind several advantageous effects are achieved. One effect of having a filter element which is flat in a first state and curved in a second state is that the transport and storage costs will be much reduced due to the fact that the filter element may be adapted for transport and storage in the first substantially flat shape, which in turn results in a transport and storage efficient filter element. For example, a plurality of flat filter elements may be stacked on top of each other in a space-efficient manner. Furthermore, the filter element provides an easy manufacturing process which provides for low manufacturing costs. This is achieved through a simple construction of the filter element, since it remains flat during generally the whole manufacturing process. A filter element of this kind is also, as already mentioned, possible to use in many currently available filtering systems such that the advantageous effects of the new design are utilisable in combination with existing filter housings. The filter element hence becomes available for a wide range of existing applications and not only for new future designs.

According to an embodiment the filter element comprises a locking means for locking the filter element in the second state. This enables the filter element to maintain the curved shape in the second state and to stay in this position, when transferred from the first, flat state to the second, curved state.

According to an embodiment the locking means of the filter element is located on at least one outer peripheral side of the filter element. This provides for a simple locking engagement, since the locking means is easily reachable, and hence also easy to lock in the second state.

According to an embodiment the locking means has an extension along a substantial part of the at least one outer peripheral side of the filter element. This provides for a firm locking along the substantial part of the at least one outer peripheral side.

According to an embodiment the said locking means is located on at least one of said outer peripheral sides which are directed towards each other in the second state. According to an embodiment said locking means is located on both of said outer peripheral sides which are directed towards each other in the second state. This way the one of the outer peripheral side may be locked via said locking means generally directly onto, or in the vicinity of, the other one of said outer peripheral sides such that the filter element may form a generally tubular shape.

According to an alternative or a complement to the last-mentioned embodiment, said locking means is provided on the opposite peripheral sides having a curved shape. The filter element may then be locked in the second, curved shape by engaging a correspondingly shaped structure provided on an inner side wall of the filter housing and/or on an inner wall of a filter housing lid.

According to an embodiment the locking means is located continuously along at least a part of the at least one outer peripheral side, preferably continuously along generally a complete extension of the at least one outer peripheral side. In addition to firm locking, it enables a sealing engagement of the filter element along at least the part of the at least one outer peripheral side, if so wished for. Sealing may for some applications be desirable in order to force the fluid to be filtered to flow the proper way through the filter and not sneak alongside without proper filtration. This enablement has been unexpected and proven very useful, since proper sealing may be difficult to achieve.

According to an embodiment the locking means is formed by a one-piece body. This provides for easy manufacturing and low manufacturing costs.

According to an embodiment the locking means is wedge-shaped. This provides for locking the filter element in both a radial and a tangential direction when curved in the second state. It is also a simple manner to provide for a locking operation.

According to an embodiment the locking means in cross-section has an adjacent section and a distant section as seen in relation to said filter material body, wherein said adjacent section is shorter than said distant section as seen in a transversal direction to a plane of said filter element. This provides for locking the filter element when arranged in the second state. According to an embodiment said adjacent section and said distended section are joined through a locking surface adapted for engaging a complimentary shaped surface for achieving a locking function. According to an embodiment the, wherein said locking surface has a slanting portion as seen in relation to said plane of said filter element.

According to an embodiment said locking means has a cross-section, which is constant along an extension direction of said at least one outer peripheral side. Such a cross-section enables the locking means to be translated axially in relation to a complimentary shaped anchoring device for maintaining the second state. Such a relative axial translation is an easy means for simultaneously achieving locking operation, a possible sealing operation and assembly and removal from a filter housing or such.

According to an embodiment said locking means is made of a compressible material. The material may provide a sealing effect along the outer peripheries of the filter element when arranged in e.g. a filter housing. The material is also slightly adjustable to a shape of a complimentary shaped anchoring device for maintaining the second state. A slight compressive force on the compressible material of the locking means may enable a stronger locking operation and better sealing operation if needed. According to an embodiment said compressible material is made of rubber, foam rubber or of polyurethane.

According to an embodiment said filter element comprises a sealing means adapted for sealing against a complimentary surface. According to an embodiment said sealing means extends along said at least one outer peripheral side of said filter element. According to an embodiment said sealing means extends along a complete periphery of the filter element.

According to an embodiment said locking means and said sealing means are formed by the same member. When incorporating both a locking operation and a sealing operation into the same member it provides for a filter element with a cost effective design. As has already been indicated above this combined effect of locking and sealing was not expected, but has proven very useful.

According to an embodiment at least one of said outer peripheral sides which are directed towards each other in the second state is straight in the second state. This is achieved through the bending of the filter element into the second state B around an axis which is parallel to the axial direction of the final shape of the filter element 5 in the second state B. The outer peripheral side in question remains flat since it also is parallel to said axis. This simplifies the design and manufacture of i.a. the locking means, since they remain flat also in the second state. When remaining flat or straight, in contrast to being curved in the second state, both the locking operation and any sealing operation is made simple and the design and material may be accordingly chosen. According to an embodiment both of said outer peripheral sides which are directed towards each other in the second state are straight in the second state.

According to an embodiment said filter material body is made of a material chosen from the group of: paper and cellulose. These materials are common materials and enables low manufacturing costs.

According to an embodiment said filter element has a generally rectangular shape in said first state. According to an embodiment said filter element in said second state has a generally tubular shape. The generally tubular shape may preferably be chosen from the group of circular, elliptic and oval, which all are common shapes for existing filter element. Hence the present filter element may be used in combination with existing filter systems.

According to an embodiment said generally tubular shape is substantially continuous in a circumferential direction. It therefore becomes easy to arrange inside a filter housing.

According to an embodiment said filter element in said second state has the shape of an arc of between 300 and 360 degrees. The more of a complete circle the filter element is covering in the second state, the larger the surface towards the fluid to be filtered becomes.

According to an embodiment the filter element in said second state has such a curved shape so that there is a distance in the circumferential direction between said opposite outer peripheral sides of said filter element, which are directed towards each other. This distance may be adapted such that an anchoring device may be arranged there between in order to maintain the filter element in the second state.

According to an embodiment the filter element comprises an inner portion for maintaining said curved shape when locked in said second state. This prevents the filter element to lose the shape in the second state, when fluid flows there through, it thus supports the shape of the filter element.

According to an embodiment the inner portion is tubular. The shape corresponds to the tubular shape of the filter element.

According to an embodiment the inner portion is fluid permeable in order to enable fluid to flow there through.

According to an embodiment the filter element is adapted for transportation in said a first state, in which it has a substantially flat shape, and for being curved to said second state in association with a filter element exchange operation. This provides for a costs effective transportation and low storage costs.

According to an embodiment the filter element is an air filter element. According to an embodiment the filter element is adapted for cleaning intake air of an internal combustion engine.

According to an embodiment the filter element is adapted to be closely aligned with a curved inner surface of the filter housing. This provides for a proper utilisation of filtering ability for the filter element, since the fluid to be filtered is thereby spread generally equally over the filter element.

According to a second aspect of the disclosure a filter system is disclosed, comprising a filter element and an anchoring device adapted to be arranged between the opposite outer peripheral sides of the filter element when it is curved to the second state. This enables the locking means to lock to the anchoring device, and consequently to keep the filter element in a curved shape, in the second state. Further advantages are already disclosed in connection with the filter element above.

According to an embodiment the anchoring device has a locking means which is adapted to engage with the locking means of the filter element for locking the filter element in the second state. This provides for a secure arrangement of the filter element in the second state and for a secure locking mechanism.

According to an embodiment the locking means of the anchoring device and the filter element are formed with a complimentary shaped male-female configuration. This makes them easy to assemble.

According to an embodiment the locking means of the anchoring device is adapted to receive the locking means of said filter element through an axial relative displacement for locking the filter element in the second state. This enables an easy arrangement of the filter element to the anchoring device, and makes it easy to replace a used filter element with a new one.

According to an embodiment the locking means of the anchoring device in cross-section comprises a distant section and an adjacent section as seen in relation to a centre axis of the anchoring device, wherein, in a locked state, the distant section of said locking means of the anchoring device faces the adjacent section of said locking means. This enables a corresponding engagement between the anchoring device and the filter element. The centre axis of the anchoring device may be perpendicular to a longitudinal extension direction of the anchoring device and directed radially with regard to the tubular filter element. Further, the anchoring device may have a symmetrical cross sectional shape, wherein the centre axis may form a plane of symmetry.

According to an embodiment the distant section of the locking means of the anchoring device is shorter than said adjacent section of the locking means of the anchoring device, which enables a secure locking operation in at least the direction away from the anchoring device. According to one example, the distant section of the locking means of the anchoring device is shorter than said adjacent section of the locking means of the anchoring device in the direction of the centre axis of the anchoring device.

According to an embodiment the adjacent section and the distant section are joined through a locking surface. According to an embodiment the locking surface has a slanting portion. According to an embodiment the locking means of said anchoring device in cross-section is wedge shaped. These embodiments correspond to complimentary shaped features on the filter element and hence a proper cooperation there between is achieved.

According to an embodiment the anchoring device is axially symmetrical, which enables easy manufacturing thereof.

According to an embodiment the anchoring device extends along the locking means in the second state. This enables a locking engagement and a possible sealing operation along the filter element. According to an embodiment the locking means of the anchoring device is located continuously along at least a part of the locking means of the filter element, preferably continuously along generally a complete extension of the at least one outer peripheral side of the locking means.

According to an embodiment the locking means of said anchoring device has a cross-section, which is constant along its extension direction, in order to correspond to the locking means of the filter element.

According to an embodiment the filter system has a filter housing with a compartment adapted to receive said filter element.

According to an embodiment the anchoring device is fixedly arranged to said filter housing or in a one-piece unit with the filter housing, so that the anchoring device protrudes inwardly in said compartment. In this way it will become easy to arrange the filter element in the filter housing.

According to an embodiment the air filter housing comprises an inner portion located generally coaxially with a housing wall and within the filter housing compartment, and extending generally along the anchoring mechanism for maintaining the curved shape of the filter element when locked in the second state. As mentioned before it enables the filter element to keep a predetermined shape within the filter housing in use of the filter system.

According to an embodiment the inner portion is fluid permeable.

According to an embodiment the inner portion is tubular.

According to an embodiment the inner portion is detachably arranged to the filter housing, preferably detachably arranged to the anchoring device. This enables easy arrangement of the filter element in combination with the inner portion inside the filter housing.

According to an embodiment the inner portion is fixedly arranged to the filter housing, preferably fixedly arranged to the anchoring device. Thereby the inner portion is not lost during i.a. a filter element replacement operation.

According to an embodiment the filter housing has a tubular shape which is preferable in order to correspond to the filter element in the second state such that a fluid to be filtered is generally evenly spread between the filter housing and the filter element to fully utilize the filtering operation of the filter element.

According to an embodiment the filter housing has a filter element access opening in an axial direction of the tubular shape.

According to an embodiment in connected state of the filter system the filter element and the anchoring device together form a generally closed cross-section, whereby they together may be used to replace an existing tubular filter element.

According to an embodiment the filter system is an air filter system. According to an embodiment the filter system is adapted for cleaning intake air of an internal combustion engine.

According to a third aspect a filter element is disclosed for being removably arranged in a filter housing, said filter element comprising a filter material body, wherein said filter element has a generally tubular shape and that the filter element is discontinuous in a circumferential direction of the filter element so that there is a distance in the circumferential direction of the filter element between opposite outer peripheral sides of said filter element, which are directed towards each other. This way the filter element is arranged to perform a filtering operation when it is located within the filter housing.

According to an embodiment said filter element comprises a sealing means adapted for sealing against a complimentary surface.

According to an embodiment said sealing means extends along said at least one outer peripheral side of said filter element.

According to an embodiment said sealing means is positioned on opposite outer peripheral sides of said filter element, which are directed towards each other and wherein said sealing means is wedge-shaped for achieving a locking function relative to said complimentary surface.

According to an embodiment said sealing means is made of a compressible material.

According to an embodiment said compressible material is made of a material chosen from the group of: rubber, foam rubber and polyurethane.

According to an embodiment said filter element has the shape of an arc of between 300 and 360 degrees.

According to an embodiment said filter material body is made of a material chosen from the group of: paper and cellulose.

According to a fourth aspect a filter system is disclosed which comprises a filter element, wherein the filter system comprises an anchoring device adapted to be positioned in the space between said opposite outer peripheral sides of said filter element, which are directed towards each other, and sealingly engaged to said opposite outer peripheral sides. Thereby a generally fully closed cross-section is achieved such that a known filter element may be replaced by a filter system according to this embodiment. The anchoring device is adapted to keep the filter element in the tubular shape and to thereby maintain a proper distance to the filter housing when installed therein.

According to a fifth aspect an internal combustion engine is disclosed which comprises a filter system of the kind discussed above.

According to a sixth aspect a vehicle is disclosed which comprises an internal combustion engine of the kind discussed above.

According to a seventh aspect method is disclosed for exchange of a filter element in a filter system comprising the steps of removing a used filter insert from a filter housing, inserting a new filter element into the filter housing, which new filter element is discontinuous in a circumferential direction of the filter element, and engaging an anchoring device in a space between opposite outer peripheral sides of said filter element.

According to an embodiment the step of bending the new filter element from a first state, in which it has a substantially flat shape, to a second state, in which it has such a curved shape that said opposite outer peripheral sides of said filter element are directed towards each other, and locking said filter element in said second Further advantages and features of the present disclosure are disclosed and discussed in the following description and the accompanying drawings.

BRIEF DESCRIPTION OF THE DRAWINGS

With reference to the appended drawings, below follows a detailed description of embodiments cited merely as non-limiting examples of the present disclosure.

In the drawings.

DETAILED DESCRIPTION

Figure 1:
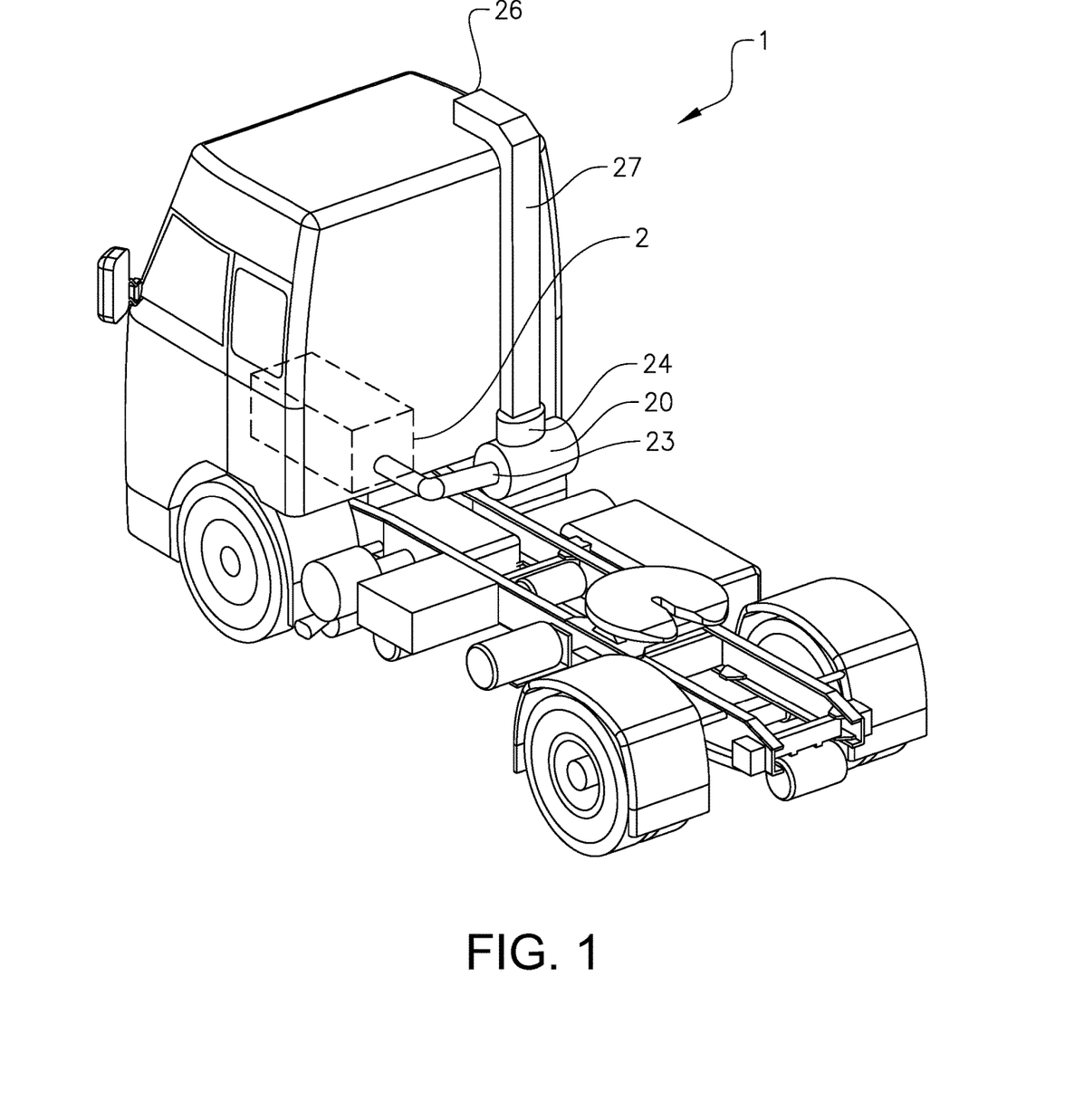
FIG. 1 is a view from behind of a vehicle carrying a filter housing and a filter element according to this disclosure.

With reference to FIG. 1 a heavy duty truck 1 is disclosed for which an internal combustion engine system 2 of a kind disclosed in the present disclosure is advantageous. However, the internal combustion engine system 2 may well be implemented also in other types of vehicles, such as in busses, in light-weight trucks, passenger cars, marine applications etc. The internal combustion engine system 2 may be e.g. a diesel engine, which as such may be running on several different types of fuel, such as diesel or dimethyl ether, DME. Other fuel types are well suited, as well as hybrid systems. The internal combustion engine system 2 is provided with an air filter element 5, an anchoring device 11 and an air filter housing 20 as disclosed herein.

The air filter element 5 of the kind disclosed herein is located downstream an air intake 26 which draws air from the ambient. The ambient air is most often in need of filtration before being directed towards an inlet of the internal combustion engine system 2. Downstream the air intake 26 an air pipe 27 directs the air to an inlet 24 of the air filter housing 20. Within the air filter housing 20 the air filter element 5 is located through which the air is filtered and further directed through an air outlet 23 and towards the internal combustion engine system 2. The air filter housing 20 is located in a lower region of the vehicle 1 and the air intake 27 in a higher region of the vehicle 1. In the depicted embodiment the air filter housing 20 is located directly behind a vehicle cab, whereas the air intake 26 is located on top of the vehicle cab at a rear end thereof. The air pipe 27 is located at the rear end in a generally vertical position of the vehicle cab. The air filter housing 20 is located having its axial direction transversal to the driving direction of the vehicle 1. The locations of the parts detailed above may well be otherwise.

Figure 2A:
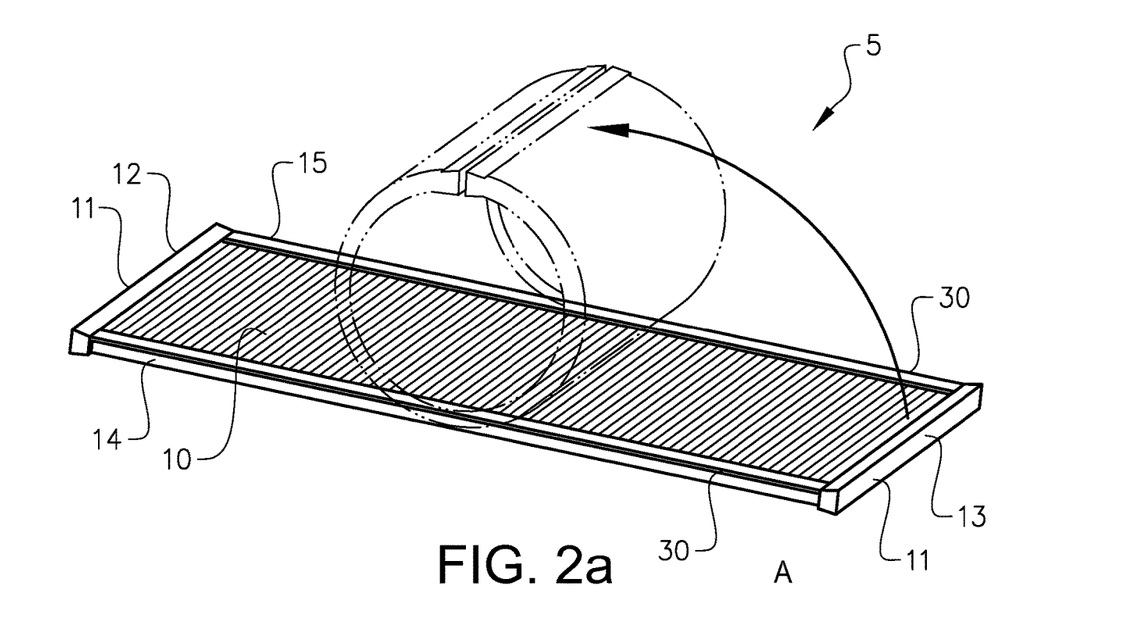
FIG. 2a is a perspective view of a filter element according to a first embodiment of this disclosure in a first state.
Figure 2B:
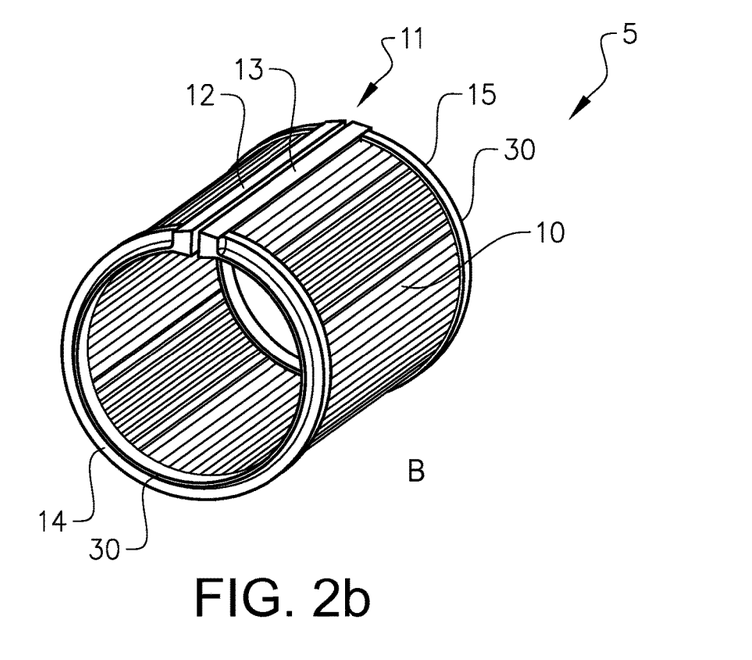
FIG. 2b is a perspective view of the filter element in FIG. 2a in a second state.

Initially a description of a first embodiment of the present disclosure will be provided based on FIGS. 2a and 2b. Reference numeral 5 refers to the whole design as shown in FIG. 2a and is named filter element. The filter element 5 is adapted to be removably arranged in the filter housing 20 and comprises a filter material body 10 made of any material that is suited for the filtering operation of the fluid to be filtered. The filter element has in the disclosed embodiment an even maximum thickness and a rectangular shape having two oppositely located, long outer peripheral sides 14 and 15, and two oppositely located, short outer peripheral sides 12 and 13. Along the sides 12, 13, 14, 15 a rim of generally the same thickness as the filter material body 10 is located in order to keep the filter material body 10 into place. The thickness of the filter element 5 is small in relation to the lengths of the outer peripheral sides 12, 13, 14 and 15. The words 'long', 'short' and 'small' should in this context be read as related to each other, i.e. their size interrelationship, not related to any other features. The filter element 5 has a corrugated or pleated surface and the filter material body 10 is made of paper.

Along the two oppositely located, short outer peripheral sides 12 and 13 a wedge-shaped locking and sealing means 11 is located continuously all along said sides 12, 13. This locking and sealing means 11 is disclosed in more detail in relation to FIG. 5. Along the two oppositely located, long outer peripheral sides 14 and 15 a tongue-shaped sealing means 30 is located continuously all along said sides 14, 15. The tongue-shaped sealing means 30 is adapted to seal against the filter housing 20 when installed therein. The sealing operation of the sealing means 30 is seen in more detail in FIG. 3. The tongue of the tongue-shaped sealing means 30 is protruding away from the side 14, 15, such that it may seal against a complimentary surface in the filter housing 20. The protruding tongue is located on the side of the filter element 5 which in use is located inwardly. Both the locking and sealing means 11 and the sealing means 30, as well as the rim along the sides 12, 13, 14, 15 which holds the filter material body 10 into place, are made of a flexible material which adapts to the surfaces onto which they abut or even are compressed against. The flexibility of the material is such that it is resilient enough to regain its shape after leaving the abutted or compressed state generally without remaining plastic deformation, but also elastic enough to adapt and comply with the complimentary surfaces.

The filter element 5 is adapted to assume a first state A, in which it has a substantially flat shape which is shown in solid lines in FIG. 2a. The filter element 5 is also adapted to assume a second state B, in which it has such a curved shape, that opposite outer peripheral sides 12, 13 of the filter element 5 are directed towards each other, and which is disclosed in FIG. 2b. The filter element 5 is adapted for e.g. manufacturing and transport in the first state A, and for a filtering operation of the fluid to be filtered in the second state B. The filter element 5 is further adapted to be positioned in the second state B when it is arranged in the filter housing 20. The filter housing 20 will be described in more detail in connection with FIG. 3. The dashed lines in FIG. 2a are showing the second state B for the filter element 5, such that both states are indicated in the same figure.

When the filter element 5 is in its first state A, it is substantially, or fully flat. In order to achieve or assume the second, and curved, state B, the two opposing peripheral sides 12 and 13, which are to be located such that they are directed towards each other, are for example gripped by the hand of an operator and lead into the position of the second state B. This is indicated by an arrow in FIG. 2a. In the second state B, the two outer peripheral sides 12, 13 that are directed towards each other have a distance between them. The distance may be of a magnitude representing a circular segment of generally 0 to 60 degrees, meaning that the filter element 5 covers, or is bent into, an arc of generally 300 to 360 degrees. The material of the filter material body 10 and the build-up and design of the filter element 5 should thus be able to manage being bent to such an extent. The combination of filter element thickness and material properties may be factors affecting this bendability, but others may apply.

A filter element 5 of the kind disclosed is generally simple to manufacture, easy to store and transport, and may only on-site in connection with its final use environment, be made to assume the second, filtering, state B. Transportation costs in terms of reduced volume needs are hence achieved. The functionality of the filter element 5, when in use in e.g. a filter housing 20 of the internal combustion engine system 2, is however maintained. The second state B corresponds to the common shape of an air filter element 5 which is used in a vehicle 1, such that the filter element 5 according to the present disclosure may be used as replacement part for known types of filter inserts and hence gain the advantages here from.

It should be noted that the filter element 5 in this embodiment may be provided with an uneven thickness, such that different parts of i.a. the filter material body 10 may have a smoothly or step-wise altering thickness over the extent of the filter element 5. The filter element 5 may also have other than a corrugated or pleated surface, as they are depicted in FIGS. 2a and 2b, such as a flat surface, or a surface having peaks and valleys. The filter element 5 may further have a cross-section of either continuous or discontinuous material types. The location, shape and material of the locking and sealing means 11 and the sealing means 30 may also be of different kind, as disclosed below.

In the depicted embodiment it is the outer peripheral sides denominated 12 and 13 that are shorter than the outer peripheral sides 14 and 15, but this length relationship may naturally be the opposite one. The filter element 5 may also have another shape than rectangular, such as rhomboid, or have outer peripheral sides that are not straight, but curved or made up by a discontinuous line comprising several straight parts in an angle to each other.

The filter element 5 is discontinuous in the second state B in a circumferential direction of the filter element 5, so that there is a distance in the circumferential direction of the filter element 5 between opposite outer peripheral sides 12, 13 of the filter element 5, which are directed towards each other.

Figure 3:
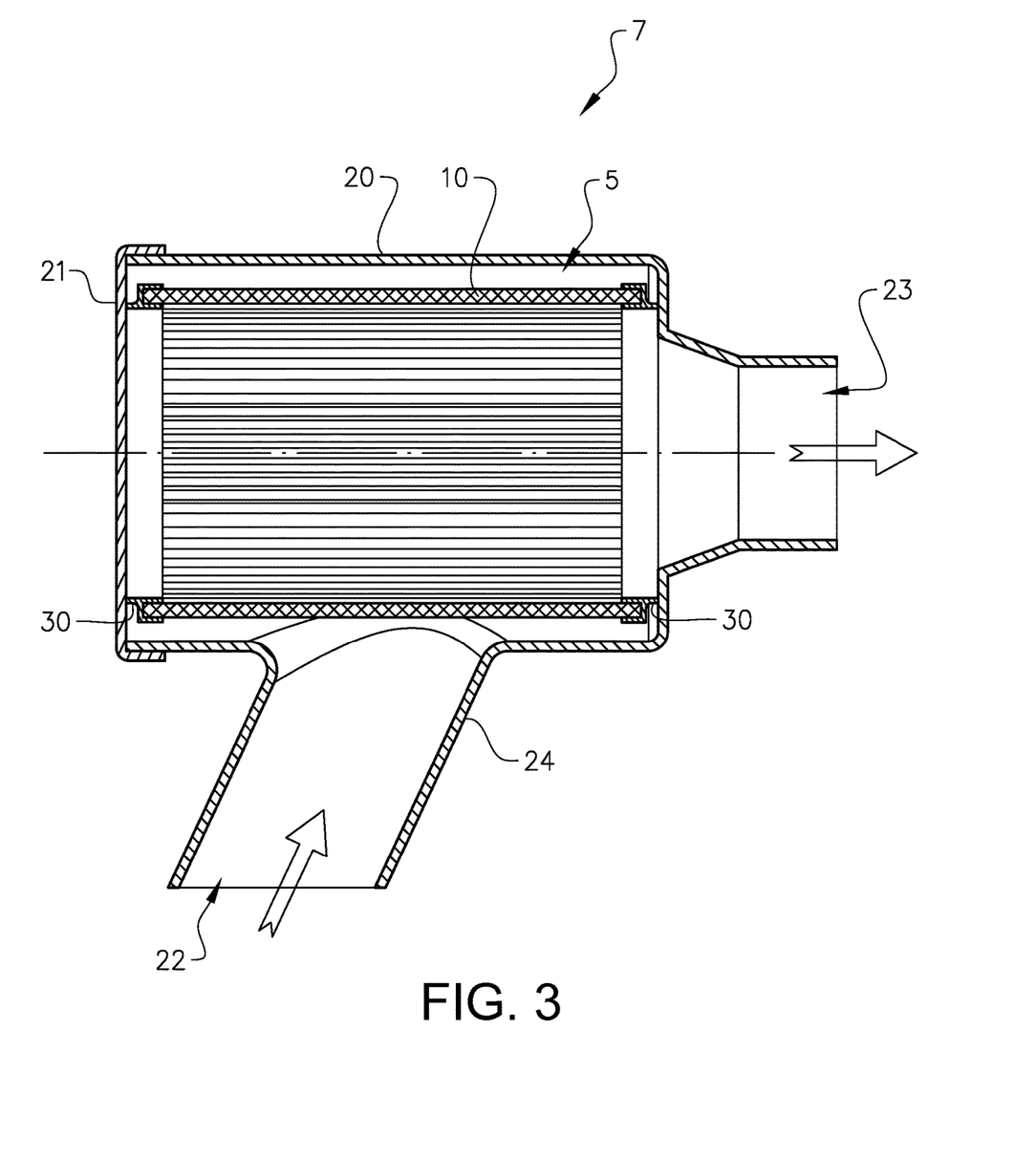
FIG. 3 is a section along an axial direction and showing a filter housing and a filter element according the first embodiment of this disclosure.
Figure 4:
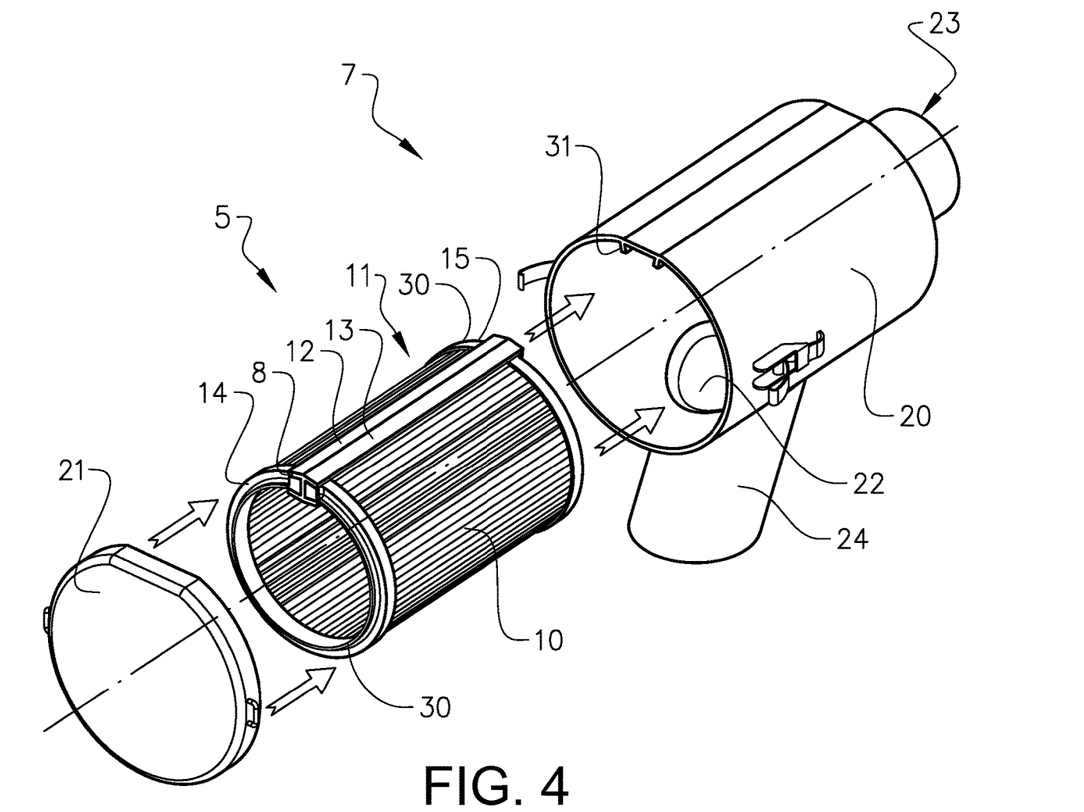
FIG. 4 is a perspective view of the filter housing and filter element of FIG. 3 during assembly.

FIGS. 3 and 4 disclose the same embodiment as is disclosed in FIGS. 1, 2a and 2b. FIGS. 3 and 4 disclose the filter element 5 when it is removably arranged in a filter housing 20. The filter element 5 together with the filter housing 20 represents a filter system 7 according to this disclosure. The filter housing 20 has a housing lid 21 in one of its axial ends for closing and possibly sealing of the filter housing 20. Before installing the filter element 5 in the filter housing 20 an anchoring device 8 is slidingly and removably attached to the locking and sealing means 11 in order to maintain the filter element 5 in the second state B. The anchoring device 8 is further disclosed in relation to FIGS. 7-9 below. The filter element 5 is then advanced into the filter housing 20 through an opening which is laid bare when the housing lid 21 has been removed, which operation is particularly disclosed in FIG. 4 and indicated using two arrows in the mounting direction of the filter element 5. The filter element 5 enters the filter housing 20 in its axial direction for easy utilisation and/or maintenance in a sliding manner. The filter housing 20 comprises an inwardly protruding guiding means 31 for guiding the anchoring device 8 into place. The guiding means 31 comprises two guiding shanks which grasp around the back of the anchoring device 8. The guiding means 31 together with the tongue-shaped sealing means 30 cooperate to maintain the filter element 5 in position within the filter housing 30. The housing lid 21 is closed against the filter housing 20 using two evenly spread locking clips, not further discussed. The number, position and type of closing means, such as the disclosed locking clips, may be made differently.

FIG. 3 further illustrates a flow of air to be filtered through the filter material body 10 and the filter housing 20, comprising the fluid inlet 22 and the fluid outlet 23. The fluid inlet 22 is located in the curved outer periphery, or in other words, in the envelope surface of the filter housing 20. The fluid inlet 22 is furthermore slightly inclined in relation to a normal to the outer periphery. In the axial end opposite to the housing lid 21, the fluid outlet 23 is located. When in use, the air to be filtered hence enters the filter housing 20 through the fluid inlet 22, spreads around the outside of the filter element 5 within the filter housing 20, penetrates through the filter element 5 and the filter material body 10, such that the air is filtered, and finally the filtered, and preferably generally cleaned air, leaves the filter housing 20 through the fluid outlet 23. The pipe 24 which connects to the fluid inlet 22 is inclined such that the fluid has a flow component directed slightly towards the fluid outlet 23. The filter housing 20 has generally the same curved shape as the filter element 5 in order to distribute the air well around the filter element 5. An outer surface of the filter element 5 is adapted to be closely aligned with a curved inner surface of the filter housing 20, as depicted in FIG. 3. The filter housing 20 has a curved inner surface which is slightly larger than the outer curved shape of the filter element 5, such that the air to be filtered may spread well around the filter element 5 in order to utilise the full outer surface are of the filter element 5.

Figure 5:
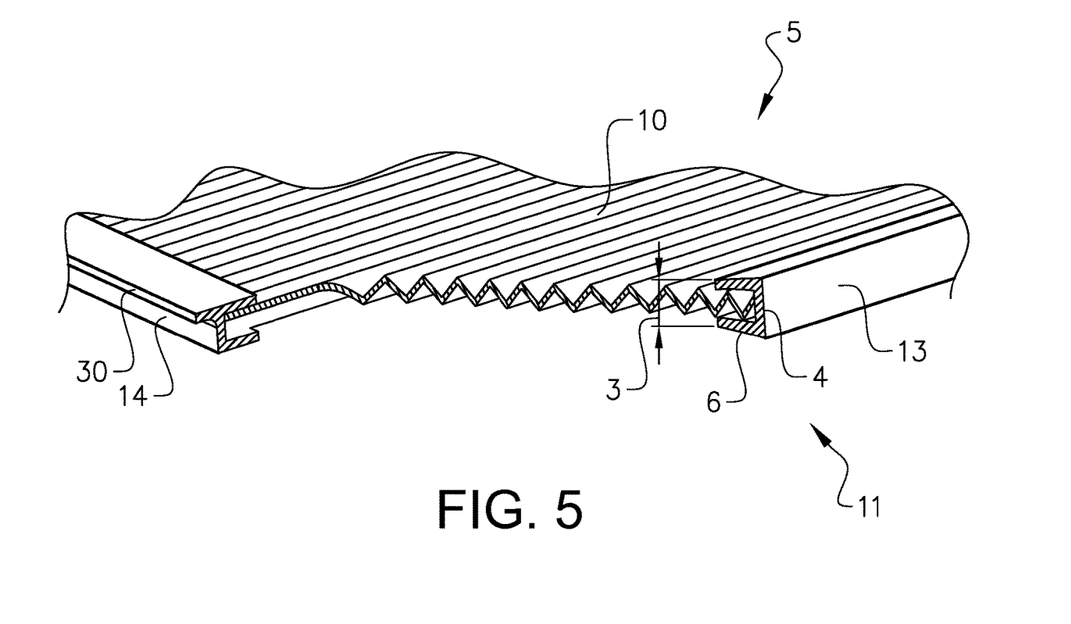
FIG. 5 is a cut partial perspective view showing a detail of the first embodiment of the filter element in the first state.

FIG. 5 discloses a detail of the filter element 5 where the locking means 11 is formed by a one-piece continuous body and is wedge-shaped. The locking means 11 is located continuously all along the two oppositely located, short outer peripheral sides 12 and 13. In cross-section the locking means 1I has an adjacent section 3 and a distant section 4, as seen in relation to the filter material body 10. The adjacent section 3 is shorter than the distant section 4. The adjacent section 3 has a length which is generally equal to the thickness of the filter element 5. It may however be both shorter and longer than said thickness. The adjacent section 3 and the distant section 4 are joined through a locking surface 6, which is adapted for engaging a complimentary shaped surface 19 (see FIG. 7a) for achieving a locking function. Such a complimentary shaped surface 19 could be part of an anchoring device 8 discussed in detail in relation to e.g. FIGS. 7a and 7b below. The locking surface 6 has a slanting portion as seen in relation to the plane of the filter element 5 when lying flat in the first state A. Further, the cross-section of the locking means 11 is constant along an extension direction of the at least one outer peripheral side 12, 13. In the depicted embodiment the continuously slanting locking surface 6 is located on a side of the filter element 5 which in the second state B is facing inwardly, "into" the inner volume created by the curved shape. The locking surface 6 could also be directed outwardly, i.e. in an opposite direction, but an advantage of the depicted embodiment is that the outer surface of the locking means 11 is now following the outer surface of the filter element 5, such that a continuous outer periphery is created without any protruding parts that may interfere with the space surrounding the filter element 5.

The locking means 11 is made of a compressible material e.g. rubber, foam rubber, polyurethane etc. Such materials are easy to manufacture and handle, are easily given a desired shape and may also adjust to the complimentary shaped anchoring device 8 when assembled thereto.

The filter element 5 further comprises a sealing means 11, 30 adapted for sealing against a complimentary shaped surface 19. The sealing means 11, 30 extends along the at least one outer peripheral side 12, 13, 14, 15 of the filter element 5, preferably along a complete periphery of the filter element 5. The locking means 11 and the sealing means 11, 30 are in this embodiment formed by the same member along the two oppositely located, short outer peripheral sides 12 and 13. The provision of both a locking effect and a sealing effect in the same member simplifies the design of the filter element 5. The sealing means 30 along the two oppositely located, long outer peripheral sides 14 and 15 do not comprise a locking effect.

The at least one of said outer peripheral sides 12, 13 of the filter element 5, which are directed towards each other in the second state B, is straight in the second state B. In the embodiment which is depicted in FIG. 5 both of the outer peripheral sides are straight. Thereby it becomes an easy operation to assemble the filter element 5 with the complimentary shaped surface 19, which may be part of the anchoring device 8 as later described. When the surfaces in question 12, 13 are straight in the second state B, the filter element 5 may be lead into the second state B by an operator, held in this position or state, and then be moved axially in relation to the complimentary shaped surface 19 or anchoring device 8. Thereby the locking surface(s) 6 of the locking means 11 is/are locking, and possibly, sealing against the complimentary shaped surface 19. Straight surfaces make this operation simple and smooth. The requirements placed on the design and material of the locking means 11 are also simplified if the locking means 11 remain straight in the second state B.

Figure 6A:
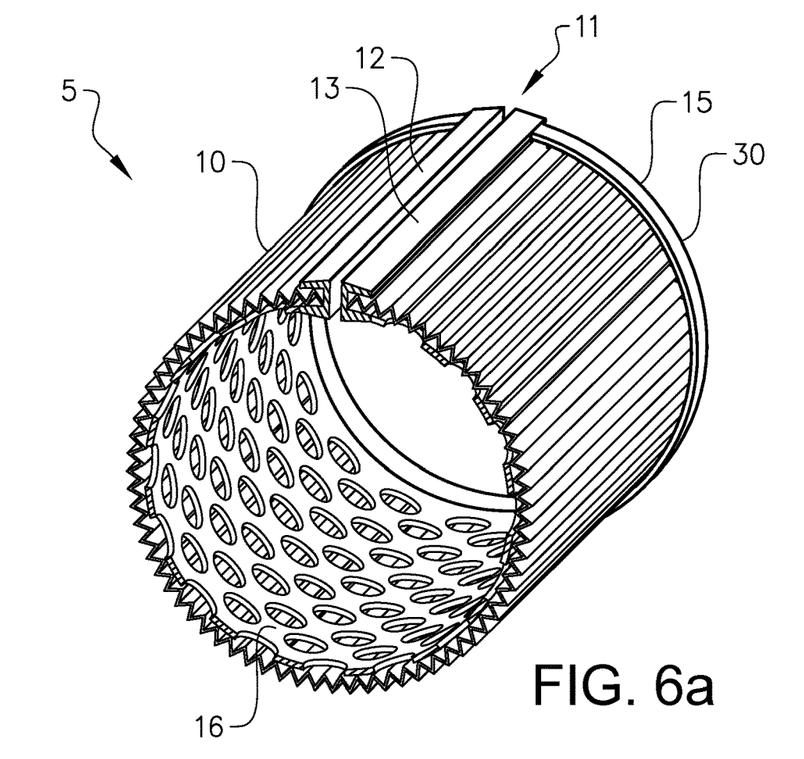
FIG. 6a is a cut perspective view of the first embodiment of the filter element and an inner section.
Figure 6B:
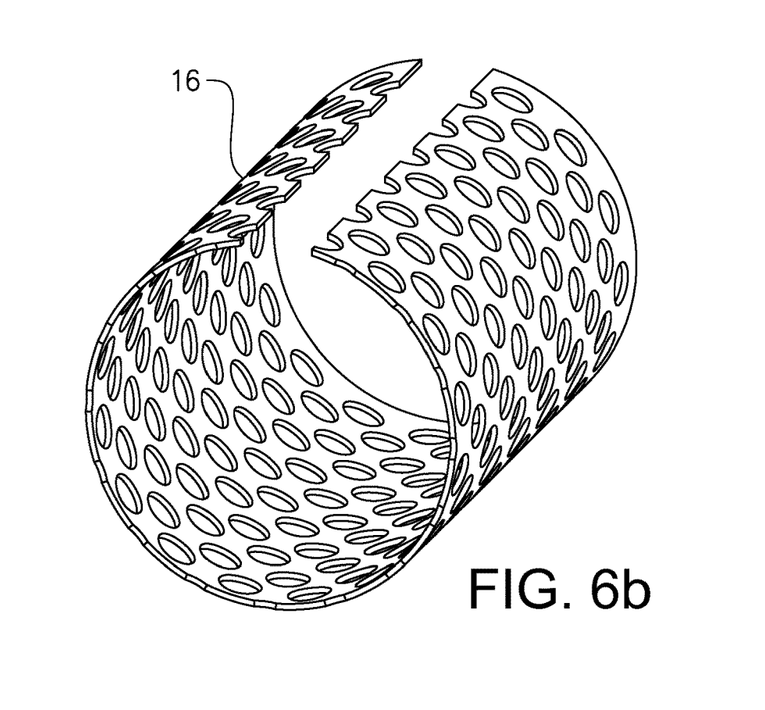
FIG. 6b is a perspective view of the inner section shown in FIG. 6a, FIG. 7a is a partial cross-section of a locking means assembled with an anchoring device according to the first embodiment.

As illustrated in FIGS. 6a and 6b, the filter element 5 of this embodiment comprises an inner portion 16 for maintaining the curved shape when locked in the second state B. The inner portion 16 is tubular and fluid permeable. The inner portion 16 is further separate from, but attachable to, the anchoring device 8. In the depicted embodiment the inner portion 16 is perforated and made of a moulded plastic, but it may also be made of e.g. a mesh of thin threads of e.g. steel or other generally form-stable material. The material of the inner portion 16, in combination with its design, is chosen such that the stiffness is adapted to the forces placed on the filter element 5 when a flow of fluid penetrates through the filter element 5 when it is used. It is preferable that the inner portion 16 is given a design which reduces the flow rate through the filter element 5 to a minimum extent.

Figure 7A:
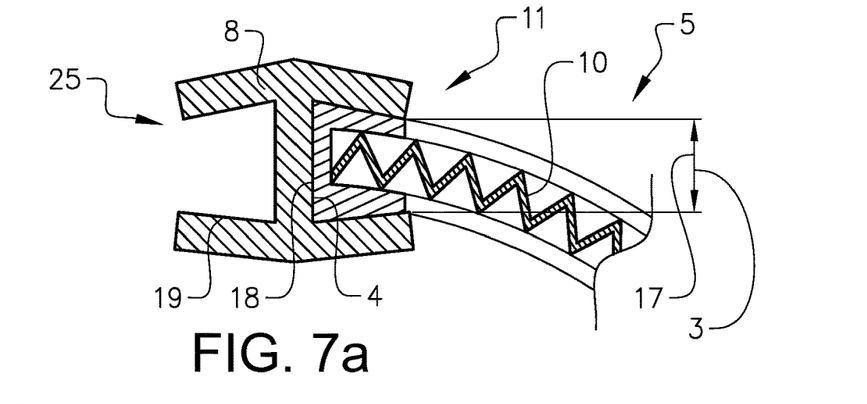
Figure 7B:
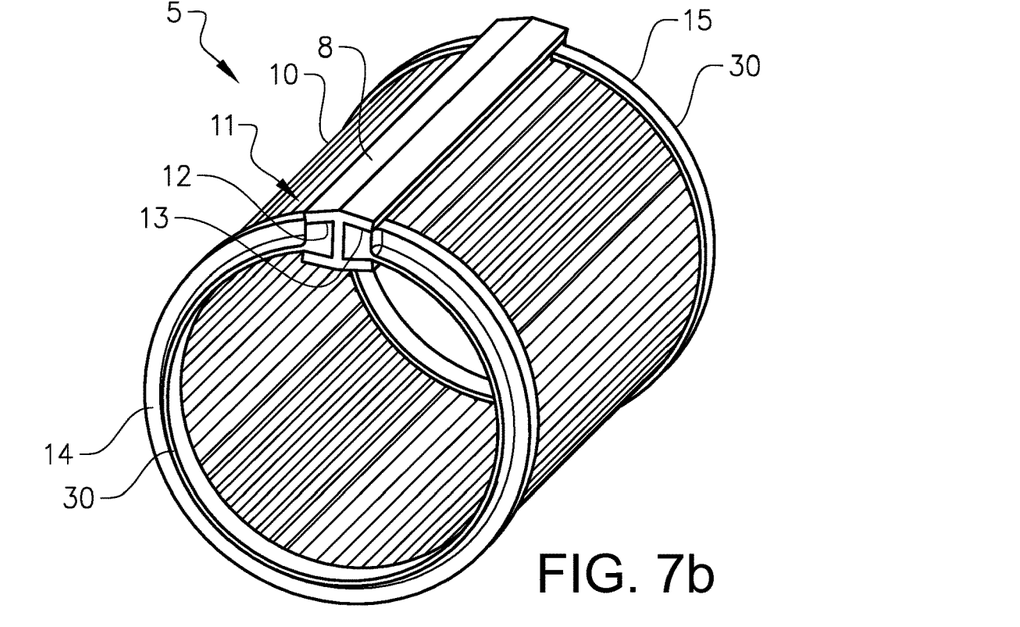
FIG. 7b is a perspective view of a filter element assembled with the anchoring device shown in FIG. 7a, FIGS. 8a to 8c are cross-sections of different embodiments of anchoring devices.

According to FIGS. 7a and 7b a filter system 7 is disclosed comprising the filter element 5 and an anchoring device 8. The anchoring device 8 is adapted to be arranged between the opposite outer peripheral sides 12, 13 of the filter element 5 that are directed towards each other when the filter element 5 is curved to the second state B. The anchoring device 8 has a locking means 25, which is adapted to engage with the locking means 11 of the filter element 5 for locking the filter element 5 in the second state B. The locking means of the anchoring device 8 and the filter element 5 are formed with a complimentary shaped male-female configuration providing a secure locking mechanism. It may also provide sealing as earlier described. The locking means 25 of the anchoring device 8 is adapted to receive the locking means 11 of the filter element 5 through an axial relative displacement for locking the filter element 5 in the second state B, according to the embodiment of FIG. 7b.

As illustrated in FIG. 7a the locking means 25 of the anchoring device 8 in cross-section comprises a distant section 17 and an adjacent section 18 as seen in relation to a centre axis of the anchoring device 8. In a locked state between the filter element 5 and the anchoring device 8, the distant section 17 of the locking means 25 of the anchoring device 8 is located generally at the same cross-sectional position as the adjacent section 3 of the locking means 11 of the filter element 5. In this state also the adjacent section 18 of the locking means 25 of the anchoring device 8 is facing the distant section 4 of the locking means 11 of the filter element 5. The locking surface 6 of the locking means 11 of the filter element 5 is facing the complimentary shaped surface 19 of the anchoring device 8. The length of the distant section 17 of the anchoring device 8 is generally the same as the length of the adjacent section 3 of the locking means 11. The length of the adjacent section 18 of the anchoring device 8 is generally the same as the length of the distant section 4 of the locking means 11. Depending on the material of the locking means 1 of the filter element 5, the possible inherent compressibility of the material may be utilised such that the length of the section in question of the locking means 11 of the filter element 5 may be slightly longer than the corresponding section of the anchoring device 8, such that both proper locking and possible sealing is achieved. In a connected state of the filter system 7, the filter element 5 and the anchoring device 8 together form a generally closed circular cross-section.

Figure 8A:
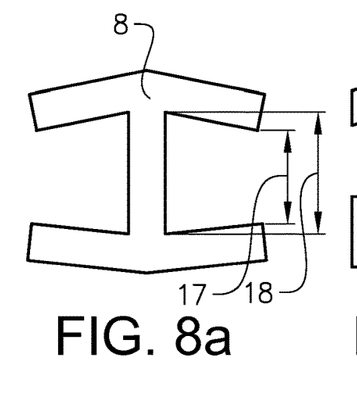
Figure 8B:
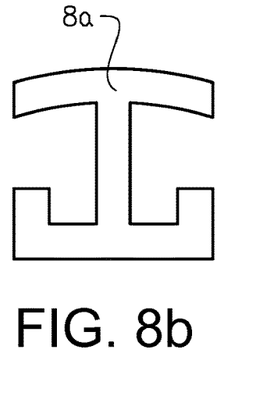
Figure 8C:
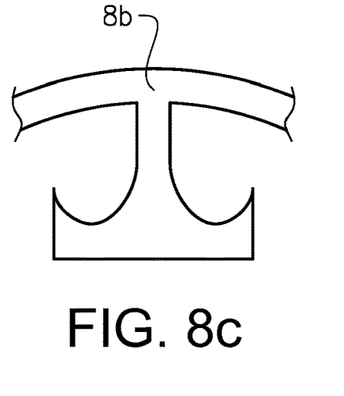
Figure 9:
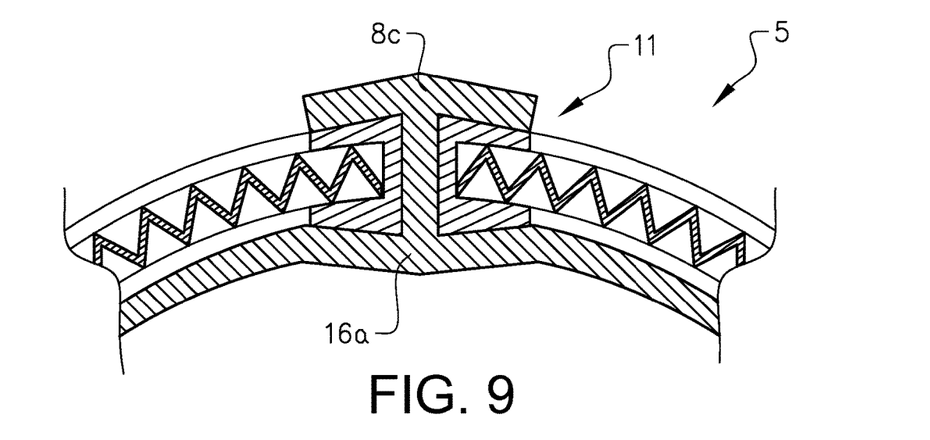
FIG. 9 is a partial cross-section of the locking means assembled with a second embodiment of the anchoring device having integrally formed the inner section.

The anchoring device 8 could also be differently shaped in cross-section as illustrated in FIGS. 8a-8c, starting in FIG. 8a with the embodiment 5 which has already been disclosed. As long as the geometrical relationship requirements between the adjacent section 18 and the distant section 17 are achieved as mentioned above, the anchoring device 8, 8a and 8b could have any shape found advantageous. The anchoring device 8a of FIG. 8b discloses a locking surface which is built up by two straight surfaces at an angle to one another. The anchoring device 8b of FIG. 8c is made in one piece with a filter housing and has a curved locking surface. The anchoring device 8, 8a, 8b is preferably axially symmetrical as in the depicted embodiments, but may also be shaped having different configurations on left hand side and right hand side as seen in the figures. Combinations of these embodiments may apply. The locking means 11 of the filter element 5 should be of corresponding cross-sectional shape.

The anchoring device 8, 8a, 8b extends along the full axial length of the locking means 11 of the filter element 5 in the second state B. The locking means 25 of the anchoring device 8, 8a, 8b is located continuously along at least a part of the locking means 11 of the filter element 5, preferably continuously along generally a complete extension of the at least one outer peripheral side 12, 13 of the locking means 11. Furthermore, the locking means 25 of the anchoring device 8, 8a, 8b has a cross-section, which is constant along its extension direction. The anchoring device 8, 8a, 8b may also be split up into two halves, such that it has two generally equally, but oppositely shaped locking means 25. In such a case each half may be separated from the other half such that a greater distance is provided between the outer peripheral sides 12 and 13 when positioned in the second state B. In an embodiment of the filter element 5 which has only locking means along one of the outer peripheral sides 12 and 13, one such half of the anchoring device 8 is sufficient. It is also possible to use an anchoring device 8, 8a, 8b which does not extend along the full axial length of the locking means 11 of the filter element 5 in the second state B. Instead several shorter ones could be used, which together sum up to a length which extends along the full axial length of the locking means 11 of the filter element 5 in the second state B.

Figure 10:
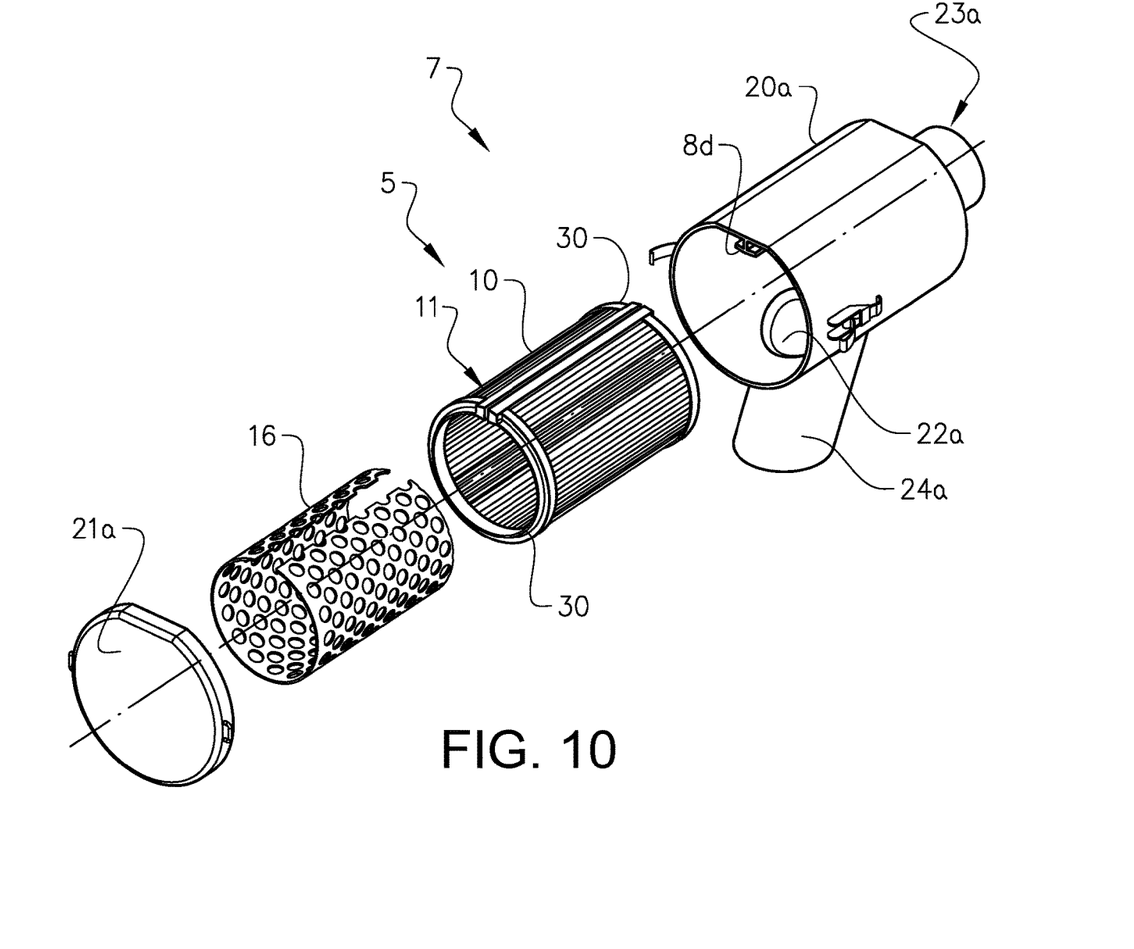
FIG. 10 is an exploded view showing a filter housing, a filter element, an inner section and a housing lid according to a third embodiment.

The filter system 7 may further comprise the filter housing 20, as illustrated in FIGS. 3 and 4, having a compartment which is adapted to receive the filter element 5 when it is positioned in its second state B. The anchoring device 8 may be fixedly arranged to the filter housing 20a, or in a one-piece unit with the filter housing 20a, so that the anchoring device 8d permanently protrudes inwardly into the compartment. Such a filter housing embodiment is depicted in FIG. 10. The filter housing 20a here receives the inner portion 16, which is located generally coaxially with a housing wall and within the filter housing compartment. The inner portion 16 extends generally along the anchoring device 8 for maintaining the curved shape of the filter element 5 when locked in the second state B. The inner portion 16 is detachably arranged to the filter housing 20, and detachably arranged to the anchoring device 8. According to a an embodiment the inner portion 16 may be fixedly arranged to the filter housing 20, or the inner portion 16a may be fixedly arranged to the anchoring device 8c, as disclosed in FIG. 9. In this embodiment the inner portion 16a is made in one piece with the anchoring device 8c.

It should be noted that the filter housing 20,20a may have many other designs than the ones disclosed above and still maintain the function in relation to the filter element 5. The locations of the fluid inlet 22 and fluid outlet 23 may be on other parts of the filter housing 20, 20a, the direction of fluid flow may be opposite, the size of the filter housing 20, 20a in relation to the filter element 5, 5a may be different etc. without deviating from the scope of the present disclosure.

Figure 11:
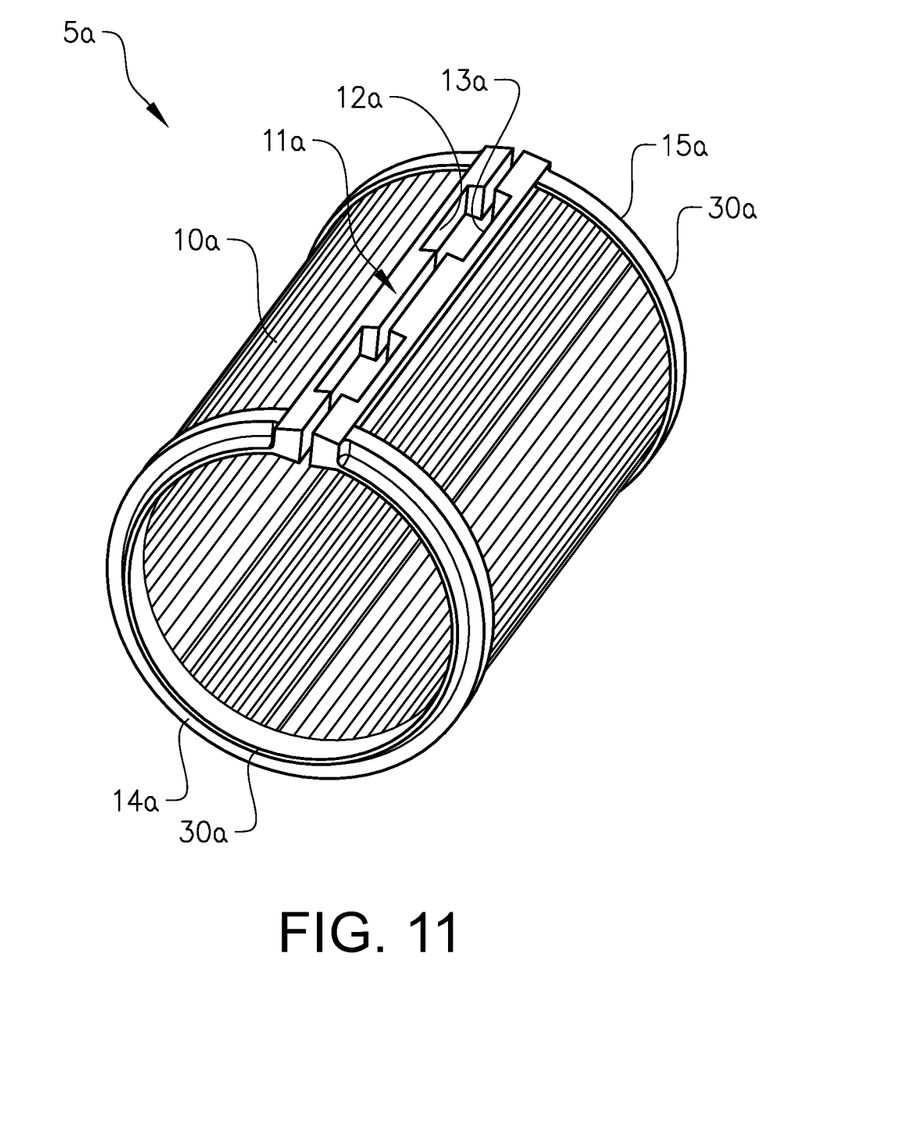
FIG. 11 is a perspective view of a second embodiment of the filter element.

In the filter element embodiment disclosed in FIG. 11, the filter element 5a comprises a locking means 11a for locking the filter element 5a in the second state B. The locking means 11a is in the depicted embodiment located on the outer peripheral sides 12a and 13a which are directed towards each other in the second state B, but should be located on at least one of the outer peripheral side 12a, 13a, 14a, 15a of the filter element 5a. Further, the locking means 11a has an extension along a substantial part of the at least one outer peripheral side 12a, 13a, 14a, 15a of the filter element 5a. In the depicted embodiment the locking means 11a are discreet locking means 11a covering more than 50% of the length of the filter element 5a. The length and number of discreet locking means 11a should preferably be adapted to the length of the outer peripheral side on which it is located in combination with the locking strength needed to maintain the second state B. In the embodiment, there are three discreet ones located on either one of the outer peripheral sides 12a and 13a. The locking means 11a could further be located continuously along at least a part of the at least one outer peripheral side 12a, 13a.

A typical embodiment of the filter element 5, 5a when used in connection with an internal combustion engine system 2, i.e. when the filtering operation is performed on air such as ambient air, could have a filter material body 10, 10a made of a material such as paper or cellulose. The filter element 5, 5a would in the second state B be curved into a generally tubular shape, e.g. circular, elliptic or oval, which shape preferably is continuous in a circumferential direction.

The filter element 5, 5a according to any one of the embodiments herein may be used in other applications than the automotive use disclosed in relation to FIG. 1, and for other types of fluids than air.

The present disclosure is also accompanied by a method for exchange of the filter element 5, 5a in the filter system 7, 7a. The exchange method comprises the steps of removing a used filter insert from the filter housing 20, 20a and inserting a new filter element 5, 5a into the filter housing 20, 20a. The new filter element 5, 5a is discontinuous in a circumferential direction of the filter element 5, 5a. The method further comprises the step of engaging an anchoring device 8, 8a, 8b, 8c, 8d in a space between opposite outer peripheral sides 12, 12a, 13, 13a of the filter element 5, 5a. The used filter insert may be a filter element 5, 5a according to this disclosure, but may also be another type of filter of a known kind. The new filter element 5, 5a is a filter element 5, 5a according to this disclosure.

Further, the method comprises the step of bending the filter element 5, 5a from a first state A, in which it has a substantially flat shape, to a second state B, in which it has such a curved shape that said opposite outer peripheral sides 12, 12a, 13, 13a of the filter element 5, 5a are directed towards each other, and locking the filter element 5, 5a, in the second state B to the anchoring device 8, 8a, 8b, 8c, 8d.

The alternative embodiments which have been disclosed above may be combined in any way which is found advantageous, unless anything else is explicitly stated, as long as the features of the main claims are fulfilled.

It is to be understood that the present invention is not limited to the embodiments described above and illustrated in the drawings; rather, the skilled person will recognize that many changes and modifications may be made within the scope of the appended claims.

The invention claimed is:

1. A filter system comprising a filter element connectable to a filter housing, the filter element comprising a filter material body, wherein the filter element is adapted to assume a first state, in which it has a flat shape, and a second state, in which it has such a tubular shape, that opposite outer peripheral sides of the filter element are directed towards each other and in which it is adapted for a filtering operation, wherein the filter element further comprises a locking means for locking the filter element in the second state when arranged in the filter housing, wherein the filter system further comprises an anchoring device arranged between the opposite outer peripheral sides of the filter element in the second state, the anchoring device having a locking means which is adapted to engage with the locking means of the filter element for locking the filter element in the second state wherein the locking means of the anchoring device in cross-section comprises a distant section and an adjacent section as seen in relation to a center axis of the anchoring device, which center of the anchoring device is perpendicular to a longitudinal direction of the anchoring device and directed radially with regard to the filter element, wherein, in the locked state, the distant section of the locking means of the anchoring device faces the adjacent section of the locking means, wherein the distant section of the locking means of the anchoring device is shorter than the adjacent section of the locking means of the anchoring device, wherein the locking means of the anchoring device and the filter element are formed with a complimentary shaped male-female configuration, and wherein the locking means of the anchoring device is adapted to receive the locking means of the filter element through an axial relative displacement for locking the filter element in the second state.

2. The filter system according to claim 1, wherein the locking means is located on at least one outer peripheral side of the filter element.

3. The filter system according to claim 2, wherein the locking means has an extension along a substantial part of the at least one outer peripheral side of the filter element.

4. The filter system according to claim 1, wherein the locking means is located on at least one of the outer peripheral sides which are directed towards each other in the second state.

5. The filter system according to claim 1, wherein the locking means is located on both of the outer peripheral sides which are directed towards each other in the second state.

6. The filter system according to claim 1, wherein the locking means is located continuously along at least a part of the at least one outer peripheral side, preferably continuously along a complete extension of the at least one outer peripheral side.

7. The filter system according to claim 1, wherein the locking means is formed by a one-piece body.

8. The filter system according to claim 1, wherein the locking means is wedge-shaped.

9. The filter system according to claim 1, wherein the locking means in cross-section has an adjacent section and a distant section as seen in relation to the filter material body, wherein the adjacent section is shorter than the distant section as seen in a transversal direction to a plane of the filter element.

10. The filter system according to claim 9, wherein the adjacent section and the distant section are joined through a locking surface adapted for engaging a complimentary shaped surface for achieving a locking function.

11. The filter system according to claim 10, wherein the locking surface has a slanting portion as seen in relation to the plane of the filter element.

12. The filter system according to claim 1, wherein the locking means has a cross-section, which is constant along an extension direction of the at least one outer peripheral side.

13. The filter system according to claim 1, wherein the locking means is made of a compressible material.

14. An internal combustion engine system comprising the filter system according to claim 1.

15. A vehicle comprising the internal combustion engine system according to claim 14.

* * * * *